April 7, 1953     C. F. STEVENS ET AL     2,633,661
FISHHOOK AND LINE HOLDER
Filed April 11, 1950
FIG 1
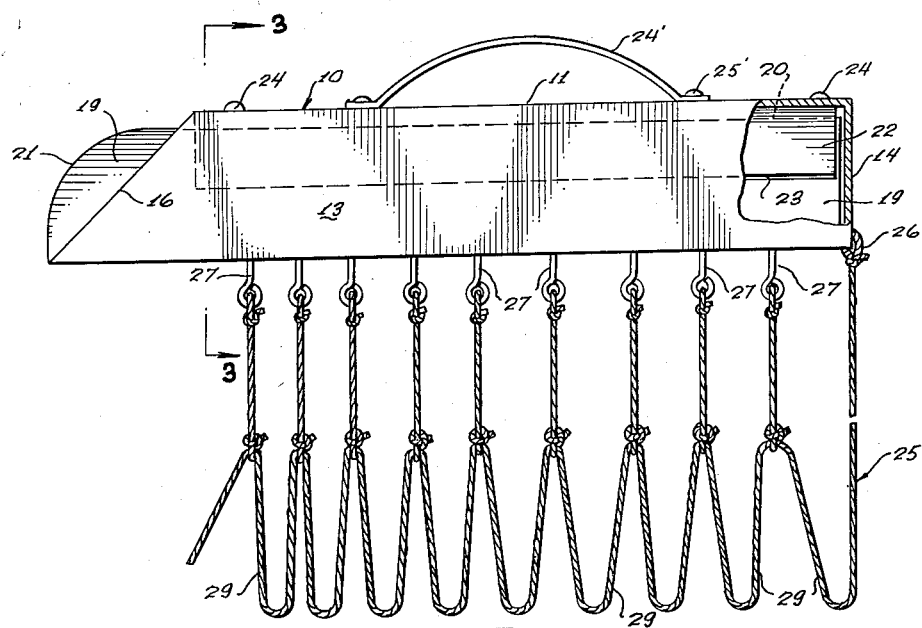
FIG 2
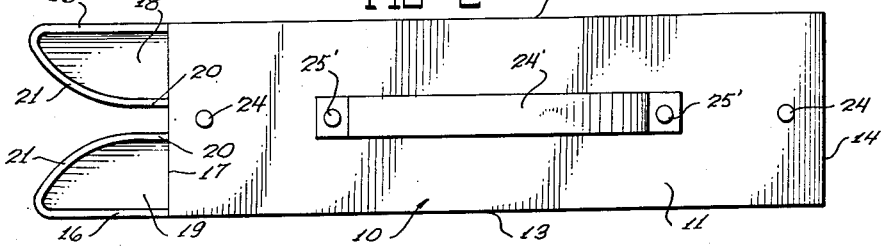
FIG 3
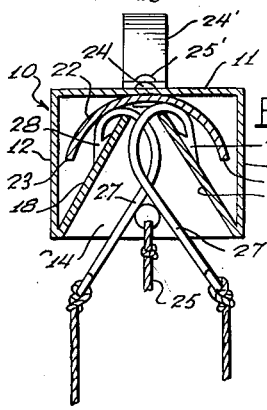
FIG 4
INVENTORS
JAMES F. RATHBURN
and
CLARK F. STEVENS
BY
McMorrow, Berman & Davidson
ATTORNEYS Patented Apr. 7, 1953

2,633,661

UNITED STATES PATENT OFFICE 2,633,661

FISHHOOK AND LINE HOLDER

Clark F. Stevens and James Fannin Rathburn, San Antonio, Tex.

Application April 11, 1950, Serial No. 155,184

2 Claims. (Cl. 43—54.5)

Our invention relates to improvements in fish hook and trot line holders.

A primary object of the invention is to provide a fish hook and trot line holder wherein the hooks are firmly held and guarded in positions from which they may be readily released in proper order, without liability of becoming entangled with the line or injuring the person handling them.

A further object is to provide a fish hook and trot line holder which is highly simplified in construction, compact, sturdy and durable and cheap to manufacture.

A still further object of the invention is to provide a fish hook holder, wherein novel resilient means serve to releasably clamp the fish hooks in stowed positions within the holder, so that the hooks are completely inclosed and held against accidental displacement.

Other objects and advantages of the invention will be apparent during the course of the following description.

In the accompanying drawings, forming a part of this application, and in which like numerals are employed to designate like parts throughout the same, Figure 1 is a side elevational view of a fish hook and trot line holder embodying our invention and illustrating the use of the same, Figure 2 is a plan view of the holder, Figure 3 is a transverse vertical sectional view taken on line 3—3 of Figure 1, and, Figure 4 is a similar transverse vertical sectional view showing different relative positions of parts of the holder when it is not in use.

In the drawings, where for the purpose of illustration is shown a preferred embodiment of our invention, the numeral 10 designates generally an elongated hollow body portion or casing, preferably formed of light sheet metal, although it may be formed of any other suitable material such as wood or some suitable plastics material. The casing 10 is substantially inverted U-shaped in transverse cross section, and includes a flat top 11 and depending vertical flat sides 12 and 13, integral therewith. The casing 10 further includes a rear vertical flat end 14, integrally connected with the top 11 and the sides 12 and 13, and this rear end 14 has a small opening 15 near its bottom edge and at the transverse center of the casing. The opposite or forward end of the casing 10 is open, and the forward edges of the sides 12 and 13 are inclined downwardly and forwardly longitudinally, as shown at 16, Figure 1. The arrangement is such that the forward transverse edge 17 of the top 11 terminates longitudinally rearwardly of the forward corners or points of the sides 12 and 13.

Integrally secured to the bottom edges of the sides 12 and 13 are a pair of opposed upwardly directed inclined converging spring plates or flanges 18 and 19, extending for the entire length of the casing 10 from the rear end 14 thereof to the forward corners of the sides 12 and 13. The spring plates 18 and 19 have their free top edges 20 spaced below the flat top 11, and the spring plates are spaced laterally inwardly of the sides 12 and 13 in upwardly diverging relation with respect to the sides. The spring plates 18 and 19 are disposed wholly within the casing 10, except for forward end portions 21 which extend longitudinally forwardly of the forward edge 17 of the top 11 and are smoothly rounded or curved upwardly and longitudinally rearwardly from the forward corners or points of the sides 12 and 13, Figures 1 and 2. The curved ends 21 of the spring plates facilitate the introduction of fish hooks into the holder, as will be more fully explained.

Rigidly secured to the underside of the flat top 11 is an elongated depending substantially semi-circular or arcuate stop plate 22, extending for the entire length of the top 11. The free bottom longitudinal edges 23 of the stop plate 22 are disposed near the vertical center of the casing 10 and spaced laterally inwardly of the sides 12 and 13 for slight distances, as shown. The stop plate 22 is preferably substantially rigid, and it may be secured to the top 11 by rivets 24, or the like. If desired, the arcuate stop plate 22 may be secured to the top 11 by spot welding or any other suitable means. The arcuate stop plate 22 receives the upper portions of the spring plates 18 and 19 within it, Figures 3 and 4, and the bottom longitudinal edges 23 are disposed near the vertical centers of the spring plates. The top longitudinal edges 20 of the spring plates extend to points near the top of the arcuate stop plate 22, and the spring plates are resiliently biased laterally outwardly or away from each other, so that the top longitudinal edges 20 will normally engage the inner face of the arcuate stop plate 22, Figure 4.

A longitudinal carrying strap or handle 24' is secured to the top 11 by rivets 25' or the like, and the handle is preferably arranged at the transverse center of the top 11, as shown.

In use, one end of a trot line 25 is tied through the opening 15, as at 26, for securing the trot line to the rear end 14. The trot line 25 carries a plurality of separate longitudinally spaced fish hooks 27, secured to the trot line at spaced intervals in the usual manner. When it is desired to hang or support the trot line for drying the same, and to house or enclose the fish hooks 27 in a compact and uniform manner, so that they will not become entangled with the trot line or injure the hands during the handling of the line, the following procedure is carried out. The first or uppermost fish hook 27 on the trot line 25 is brought into engagement with one of the curved ends 21 and slid upwardly and over such end, and down along the adjacent top longitudinal edge 20 of the selected spring plate 18 or 19. The selected spring plate will yield downwardly responsive to a slight downward pull on the fish hook, so that the fish hook may enter between the top edge 20 and the inner curved surface of the arcuate stop plate 22, Fig. 3. The first fish hook is now slid toward the rear end 14, and may be positioned as near to the rear end as desired. The next lowermost fish hook 27 on the line 25 is now brought into engagement with the other forward curved end 21 of the other spring plate, and this fish hook is introduced between the top edge 20 of the spring plate and arcuate stop plate 22 in the same manner that the first or uppermost fish hook was introduced. The second fish hook is now slid longitudinally rearwardly within the casing 10 and positioned at the desired point forwardly of the first or uppermost fish hook 27, Figure 1. As shown in Figure 3, the pointed barbs 28 of the fish hooks are downwardly directed against the outer faces of the spring plates 18 and 19, and substantially parallel to the spring plates. The barbs 28 are arranged between the spring plates 18 and 19 and arcuate stop plate 22. The spring plates 18 and 19 resiliently hold the fish hooks in clamping engagement against the arcuate stop plate, so that they will not be accidently displaced, and yet permitting the fish hooks to be freely adjusted longitudinally of the casing and readily removable from the casing when desired. The remainder of the fish hooks 27 on the trot line 25 are introduced into the casing 10, between the spring plates 18 and 19 and stop plate 22, in exactly the same manner as described above. Each successive fish hook along the trot line engages over a different one of the spring plates 18 and 19, so that the fish hooks are alternately arranged with their barbs 28 directed toward the opposite sides 12 and 13, Figure 3.

When all of the fish hooks 27 are mounted within the holder as shown and described above, the trot line 25 will be freely suspended beneath the bottom of the casing 10 in a compact and neat manner and forming separate spaced portions or loops 29. The shanks of the fish hooks project below the bottom of the casing 10, Figures 1 and 3, so that the fish hooks may be readily grasped for adjusting them longitudinally of the casing or removing them through the forward end of the same. The arrangement is such that the fish hooks will assume crossed positions within the casing, Figure 3, with their shanks substantially parallel to the spring plates 18 and 19. This makes it easy to grasp adjacent or alternate fish hooks projecting from the bottom of the casing 10 for removing them from the casing. The clamping or spring action of the spring plates 18 and 19 positively position the fish hooks 27 within the casing, so that they will remain substantially stationary with respect to the casing until adjusted or removed.

Obviously, the casing 10 may be made in any desired length so as to accommodate substantially any number of fish hooks upon a trot line of substantially any length. Our holder is light, highly compact, simplified in construction and strong and durable.

It is to be understood that the form of our invention herewith shown and described is to be taken as a preferred example of the same, and that various changes in shape, size and arrangement of parts may be resorted to, without departing from the spirit of the invention or the scope of the subjoined claims.

Having thus described our invention, we claim:

1. In a holder for a trot line and fishhooks, the fishhooks having crooks including barbed points, an elongated casing having a top wall, laterally spaced longitudinal side walls on and projecting on the same side of said top wall, spring flanges on and extending along the laterally inward sides of said side walls, said spring flanges diverging from the laterally inward sides of the side walls in a direction toward said top wall and converging toward each other in the direction of the top wall, said spring flanges terminating in free longitudinal edges spaced close to the said side of the top wall, and a relatively rigid stop plate extending longitudinally along the said side of the stop plate and fixed thereto, said stop plate being positioned in the space between said top wall and the free edges of said spring flanges, said stop plate being of arcuate transverse cross-section with the concave side thereof facing the free longitudinal edges of said spring flanges, said stop plate having longitudinal edges overlying and in laterally outwardly spaced relation to the laterally outward sides of said spring flanges, the fishhooks being adapted to be positioned in the casing with their crooks engaged over the free longitudinal edges of the spring flanges and their barbed points engaged with the laterally outward sides of a spring flange, the spring flanges being tensioned toward the stop plate so as to compress the hooks between the stop plate and a spring flange.

2. In a holder for a trot line and fishhooks, the fishhooks having crooks including barbed points, an elongated casing having a top wall, laterally spaced longitudinal side walls on and projecting on the same side of said top wall, spring flanges on and extending along the laterally inward sides of said side walls, said spring flanges diverging from the laterally inward sides of the side walls in a direction toward said top wall and converging toward each other in the direction of the top wall, said spring flanges terminating in free longitudinal edges spaced close to the said side of the top wall, and a relatively rigid stop plate extending longitudinally along the said side of the stop plate and fixed thereto, said stop plate being positioned in the space between said top wall and the free edges of said spring flanges, said stop plate being of arcuate transverse cross-section with the concave side thereof facing the free longitudinal edges of said spring flanges, said stop plate having longitudinal edges overlying and in laterally outwardly spaced relation to the laterally outward sides of said spring flanges, the fishhooks being adapted to be positioned in the casing with their crooks engaged over the free longitudinal edges of the spring flanges and their barbed points engaged with the laterally outward sides of a spring flange, the spring flanges being tensioned toward the stop plate so as to compress the hooks between the stop plate and a spring flange, the said free longitudinal edges of the stop plate being positioned between and out of contact with the spring flanges and the casing side walls.

CLARK F. STEVENS.
JAMES FANNIN RATHBURN.

REFERENCES CITED

The following references are of record in the file of this patent:

UNITED STATES PATENTS

| Number | Name | Date |
|---|---|---|
| 1,221,904 | Portier | Apr. 10, 1917 |
| 1,634,030 | Korkames | June 28, 1927 |
| 1,997,243 | Vanderhider et al. | Apr. 19, 1935 |
| 2,438,388 | Dolk | Mar. 23, 1948 |
| 2,447,105 | Vogel | Aug. 17, 1948 |
| 2,548,351 | Coombs | Apr. 10, 1951 |